US006789206B1

(12) United States Patent
Wierzbicki et al.

(10) Patent No.: US 6,789,206 B1
(45) Date of Patent: Sep. 7, 2004

(54) COMPUTE ELEMENT

(75) Inventors: Robert P. Wierzbicki, Worcester, MA (US); Maurice Edward Valois, Spencer, MA (US); Paul O. Malenfant, Shrewsbury, MA (US); Gregory William Lazar, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 458 days.

(21) Appl. No.: 09/676,732

(22) Filed: Sep. 29, 2000

(51) Int. Cl.[7] .............................. G06F 1/26; H01H 9/16
(52) U.S. Cl. ........................ 713/300; 200/314; 116/279
(58) Field of Search ........................ 713/300; 200/314; 116/279

(56) References Cited

U.S. PATENT DOCUMENTS

| | | | |
|---|---|---|---|
| 5,278,362 A | * | 1/1994 | Ohashi ........................ 200/5 A |
| 5,666,541 A | * | 9/1997 | Sellers ........................ 713/324 |
| 5,718,326 A | * | 2/1998 | Larose et al. ................ 200/314 |
| 6,158,000 A | * | 12/2000 | Collins ........................... 713/1 |

FOREIGN PATENT DOCUMENTS

| | | | | |
|---|---|---|---|---|
| JP | 09297554 A | * | 11/1997 | ............ G09G/3/14 |

OTHER PUBLICATIONS

IBM, Improved Personal Computer Home Control Using Power and Boot Sequence Control, Jun. 1, 1999, vol. 42 issue 422.* atomat@my–deja.com, "Re: iMac half–asleep," Jan. 30, 2000.*

Matt Wilson, "iMac DV, OS9, wont't stay asleep at all!," Feb. 4, 2000.* dpem, "iMac sleep function," May 2, 2000.*

Emergency Handbook, 1998, Apple Computer Inc, p. 11.*

\* cited by examiner

*Primary Examiner*—Thomas Lee
*Assistant Examiner*—Mark Connolly
(74) *Attorney, Agent, or Firm*—Kriegsman & Kriegsman

(57) ABSTRACT

A compute element which functions at a plurality of different power and operational states comprises a chassis which is shaped to include an interior cavity. A motherboard responsible for regulating the operational state of the compute element is disposed within the interior cavity of the chassis. An element controller responsible for regulating the power state of the compute element is similarly disposed within the interior cavity of the chassis and in connection with the motherboard. A power button is disposed in the chassis in connection with the element controller. The power button is a push-button having a built-in liquid crystal display capable of providing graphics and/or text displays and a backlight capable of providing variable color and frequency backlighting. In use, the power button enables a user to change the power state of the compute element through actuation thereof. In addition, the power button acts as an indicator for identifying the power and operational state of the compute element.

8 Claims, 6 Drawing Sheets

| Power/Operational State of Compute Element (11) | Backlight (55) | LCD Display (57) |
|---|---|---|
| ① Working Power State | Solid Green | "Power On" and/or The International Full Power Icon "I" |
| ② Working Power State with Compute Activity | Blinking/Flashing Green at a High Frequency, Such as 30 Hertz | "Power On/Compute Activity" in Conjuncture with the International Full Power On Icon "I" |
| ③ Sleeping Power State | Blinking/Flashing Green at a Relatively Low Frequency of 1 Hertz | "Sleep" |
| ④ Hibernate Power State | None | "Hibernate" |
| ⑤ Soft Off Power State | None | "Soft Off" or "Power Off" and/or International Power Off Icon "O" |
| ⑥ Full Off Power State | None | None or the International Power Off Icon "O" |
| ⑦ Fault Condition Detected | Solid Orange | Simple Text Line Stating the Particular Fault Condition that was Detected |
| ⑧ Hardware/Software Failure Resulting in a System Hang | Solid Orange | "System Hang" Followed by "Depress Power Button for Four Seconds Until System Shuts Down" |
| ⑨ Danger or Dangerous/Hazardous Condition | Solid Red | "Severe Hazard" or "Hazardous Condition Exists" |
| ⑩ NMI Dump | Color Based on Power/Operational State of Compute Element Upon NMI Dump | Confirm Start of NMI Dump and Subsequently Acknowledge Completion, Such as "NMI Dump in Process, Please Wait" Followed by "NMI Dump Complete" |

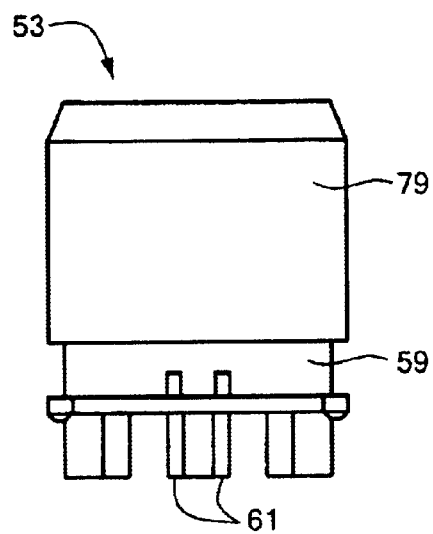
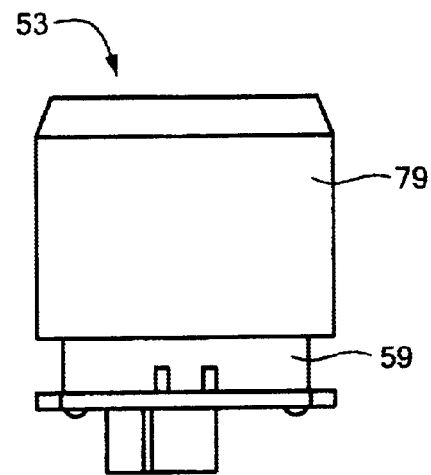
FIG. 5  FIG. 6
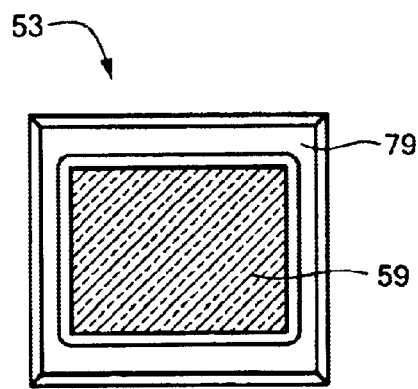
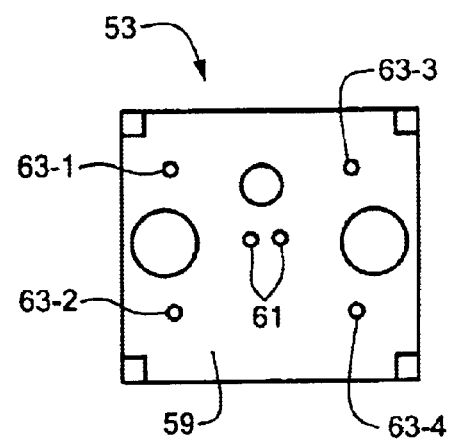
FIG. 7  FIG. 8

| Power/Operational State of Compute Element (11) | Backlight (55) | LCD Display (57) |
|---|---|---|
| ① Working Power State | Solid Green | "Power On" and/or The International Full Power Icon "I" |
| ② Working Power State with Compute Activity | Blinking/Flashing Green at a High Frequency, Such as 30 Hertz | "Power On/Compute Activity" in Conjuncture with the International Full Power On Icon "I" |
| ③ Sleeping Power State | Blinking/Flashing Green at a Relatively Low Frequency of 1 Hertz | "Sleep" |
| ④ Hibernate Power State | None | "Hibernate" |
| ⑤ Soft Off Power State | None | "Soft Off" or "Power Off" and/or International Power Off Icon "O" |
| ⑥ Full Off Power State | None | None or the International Power Off Icon "O" |
| ⑦ Fault Condition Detected | Solid Orange | Simple Text Line Stating the Particular Fault Condition that was Detected |
| ⑧ Hardware/Software Failure Resulting in a System Hang | Solid Orange | "System Hang" Followed by "Depress Power Button for Four Seconds Until System Shuts Down" |
| ⑨ Danger or Dangerous/Hazardous Condition | Solid Red | "Severe Hazard" or "Hazardous Condition Exists" |
| ⑩ NMI Dump | Color Based on Power/Operational State of Compute Element Upon NMI Dump | Confirm Start of NMI Dump and Subsequently Acknowledge Completion, Such as "NMI Dump in Process, Please Wait" Followed by "NMI Dump Complete" |

*FIG. 9*

COMPUTE ELEMENT

BACKGROUND OF THE INVENTION

The present invention relates generally to computers, such as desktop PCs, small and mid-range pedestal computers and large rack mounted computer servers, and more particularly to computers which include a power switch.

Computers, or compute elements, are often connected to a communication network, such as the internet, so as to enable information (i.e., data or files) to be passed from one computer to another computer. When large amounts of information are shared by multiple computers, a network server, or server, is often connected to the communication network to provide information to numerous network clients, or clients.

A network server enables many individual clients to access information that is stored within the single server. For example, servers are commonly used to host web sites which can be accessed by many individual computers through the internet.

The establishment of a client-server computer network creates numerous advantages. For example, a client-server relationship enables multiple clients to concurrently access information stored on a single server. In addition, a client-server relationship enables information to be added or modified to the single server rather than to each of the individual clients, thereby reducing the overall cost to maintain the system.

Pluralities of individual servers are often disposed within a rack console, or cabinet, in a stacked relationship. Rack consoles are generally rectangular in shape and are constructed to enable individual compute elements, such as computer servers or disc array subsystems, to be slidably disposed therewithin. Rack consoles are typically constructed to house components which have a width which complies with industry NEMA standards (i.e., 19 inches). Rack consoles are also typically constructed to house components which have a height which complies with industry NEMA standards (i.e., a 3-U height of approximately 5.25 inches).

Individual servers are typically manufactured to include a rectangular chassis, or housing, constructed of a hard and durable material. The chassis commonly comprises a front control panel which serves as the user interface for the server. The front control panel includes, inter alia, various indicators, such as different colored light emitting diodes (LEDs), for identifying the various power and operational states of the machine and a separate control button, such as a power button, for regulating the power state of the machine, as will be described further in detail below.

Traditional computer servers are designed to operate at a variety of different power states. Specifically, in order to be compliant with industry promulgated, advanced configuration and power interface (ACPI) specification guidelines, the operating system of a compliant computer server is required to operate between at least the following power states: a full, or working, power state; a reduced, or sleeping, power state; a limited, or soft off, power state; and a full, or mechanical, off power state.

Because traditional servers are required to operate at a variety of different operational and power states, the front control panel for common compute elements often includes, inter alia, a power button for switching the power state of the compute element between the working power state and the soft-off power state, a green LED power indicator light which, when solidly lit, notifies the user that the compute element is operating at its working power state and an orange LED indicator light which, when lit, notifies the user that the compute element is experiencing a fault condition. The user interface front control panel is also commonly provided with reset/sleep means for switching the power state of the compute element from the working power state to the sleeping power state. The reset/sleep means is required by industry standards to be provided either through the implementation of a separate sleep button or through the integration of the power button and the sleep button into a single power/sleep button. An LED sleep power indicator light functions in conjunction with the reset sleep means. Specifically, the LED sleep power indicator light, which can be any color (i.e., green), blinks slowly at 1 Hz to notify that the computer is in its sleeping state. The front control panel often additionally includes a nonmaskable interrupt (NMI) for providing an interrupt that cannot be overruled by another service request and additional LED indicator lights for indicating further machine function status, i.e., local area network (LAN) or disk activity.

It should be noted that the particular colors of the indicators are selected in order to comply with international standards for indicator colors (i.e., IEC standard 73). Specifically, international standards associate a particular implied meaning with each indicator color. For example, the indicator color red is a danger condition which implies that a severe hazard is likely if the warning is ignored. As another example, the indicator color orange is a warning condition which implies that a severe hazard can occur if the warning is ignored. As another example, the indicator color yellow is a caution condition which implies that a minor hazard will or can occur if the warning is ignored.

As can be appreciated, the implementation of numerous different indicator lights and buttons on the front control panel tends to greatly complicate the user interface of the compute element. The increased complexity of the user interface creates a few notable disadvantages. As a first example, the increased number of lights and buttons renders the compute element more expensive to manufacture. As a second example, the increased number of lights and buttons significantly complicates the user interface, thereby providing the user with a less intuitive means of recognizing the various power and operational states of the compute element.

The configuration of the front panel user interface for computer servers, such as small or large rack mounted servers, which use a MICROSOFT CORPORATION operating system and/or an INTEL CORPORATION microprocessor is required to be in compliance with the Hardware Design Guide published by MICROSOFT CORPORATION and INTEL CORPORATION. Specifically, version 3.0 of the Hardware Design Guide, which was published on Jun. 30, 2000 by INTEL CORPORATION and MICROSOFT CORPORATION, provides a reference for designing servers and peripherals which run the MICROSOFT WINDOWS 2000 server family of operating systems.

As an example, version 3.0 of the Hardware Design Guide requires that the server operating system be capable of operating between, inter alia, a working power state, a sleeping power state, a soft off power state, and a full off power state.

As another example, version 3.0 of the Hardware Design Guide requires that one or more indicators, such as in the form of a light emitting diode (LED), display, inter alia, a solid green light to notify that the compute element is operating at its working power state, a light flashing at 1 Hertz in any solid color, such as green, to notify that the compute element is operating at its low power, or sleep, state and a solid orange light to notify that the compute element is experiencing a fault condition.

As another example, version 3.0 of the Hardware Design Guide requires that the compute element include a power button over-ride mechanism. Specifically, the compute element is required to provide an over-ride mechanism which transitions the compute element from the working power state to the soft-off power state through the depression of the power button for more than four seconds. It should be noted that the power button over-ride mechanism is required to power down the compute element even when the machine experiences hardware/software failure (i.e., system hangs).

Industry promulgated compute element design guidelines have increased the total number of functions which the front panel user interface is required to perform. In addition, advancements in the complexity of compute element operating systems has further increased the total number of tasks which the front panel user interface is required to undertake. For instance, current operating systems for computer servers, such as the WINDOWS2000 operating system manufactured by MICROSOFT CORPORATION, have been designed to incorporate additional power states to render the server more power efficient, or green. Specifically, current operating systems for computer servers are programmed to include a working power state, a sleeping power state, a hibernate power state, a soft off power state and a full off power state. It should be noted that the hibernate power state is unique in that the compute element utilizes less power in the hibernate power state than in the sleeping power state. It should also be noted that the hibernate power state is unique in that, when the compute element returns to its full power state from the hibernate power state, the compute element not only restarts its operating system but also returns the user to the same application point the compute element was experiencing before hibernation. As can be appreciated, the implementation of increased numbers of different power states renders the compute element more energy and cost efficient, which is highly desirable.

Due to advancements in compute element operating systems and the increased number of industry regulated ACPI specification guidelines, it has been found that many compute elements comprise a front panel user interface which is insufficiently equipped to perform all of the numerous tasks required thereof. In addition, it has been found that the user interface front control panel of conventional servers does not provide a simple intuitive means for identifying each of the various operational and power states of the compute element. Rather, as noted above, the user interface front control panel of conventional servers typically includes a large number of individual indicators which, when viewed collectively, create a complicated user interface that is are inherently non-intuitive.

As an example, the front control panel of current compute elements does not provide different indicators to notify the user when the compute element is operating at a hibernate power state and to notify the user when the compute element is operating at a full off power state. As such, a user can mistakingly assume that a compute element in the hibernate power state is in a full off power state, thereby precluding the user with the intuitiveness to recognize that the compute element can be simply restored to its full power state by depressing the reset/power button.

As another example, the front control panel of traditional compute elements does not provide an intuitive means for instructing a user what steps to take when the compute elements experiences a system hang, or freeze. Specifically, because of the lack of intuitive instruction, most users are unaware that the compute element is equipped with a system over-ride mechanism which effectively powers off the server by depressing the power button for four seconds. As a result, instead of utilizing the system over-ride mechanism, a user will often attempt to unplug the compute element directly from its power source. As can be appreciated, a number of disadvantages are created when a user attempts to unplug the compute element directly from its power source.

As a first disadvantage, a user who attempts to unplug the compute element directly from its power source subjects himself/herself to a potentially dangerous condition, such as electrical shock.

As a second disadvantage, when the compute element is disposed within a closed rack console, the user does not have access to the electrical plug and therefore is unable to unplug the compute element directly from its power source.

As a third disadvantage, a user who attempts to unplug the compute element directly from its power source is often required to reach an electrical plug which is disposed at an inconvenient location, such as under a desk or behind a large rack console.

As a fourth disadvantage, when the compute element is routed with a number of other compute elements, a user who attempts to unplug the compute element directly from its power source runs the risk of mistakingly unplugging the wrong compute element from the power source.

SUMMARY OF THE INVENTION

It is an object of the present invention to provide a new and improved compute element.

It is also an object of the present invention to provide a compute element which includes a user interface control panel.

It is another object of the present invention to provide a compute element as described above wherein the user interface control panel is in compliance with the advanced configuration and power interface (ACPI) specification guidelines.

It is yet another object of the present invention to provide a compute element as described above wherein user interface control panel is more user intuitive.

It is still another object of the present invention to provide a compute element as described above which has a limited number of parts, which is inexpensive to manufacture and which is easy to use.

Accordingly, there is provided a compute element which is adapted to function at a plurality of different power states and which is adapted to function at a plurality of different operational states, said compute element comprising a chassis comprising a front panel, a rear panel, top panel, a bottom panel and a pair of side panels which together define an interior cavity therebetween, a motherboard disposed within the interior cavity of said chassis for regulating the operational state of said compute element, an element controller disposed within the interior cavity of said chassis for regulating the power state of said compute element, said element controller being connected to said motherboard, and a power button disposed through the front panel of said chassis for indicating at least one of the power and operational states of said compute element, said power button being connected to said element controller.

Various other features and advantages will appear from the description to follow. In the description, reference is made to the accompanying drawings which form a part thereof, and in which is shown by way of illustration, a specific embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

A fuller understanding of the nature and objects of the present invention will become apparent upon consideration of the following detailed description taken in connection with the accompanying drawings, wherein like reference numerals represent like parts:

FIG. 5 is a front plan view of the power button shown in FIG. 1;

FIG. 6 is a left side view of the power button shown in FIG. 1;

FIG. 7 is a top plan view of the power button shown in FIG. 1;

FIG. 8 is a bottom plan view of the power button shown in FIG. 1; and

FIG. 9 is a chart listing various potential indicators the power button would display upon different conditions experienced by the compute element shown in FIG. 1.

DETAILED DESCRIPTION OF THE PREFERRED EMBODIMENT

Figure 1:
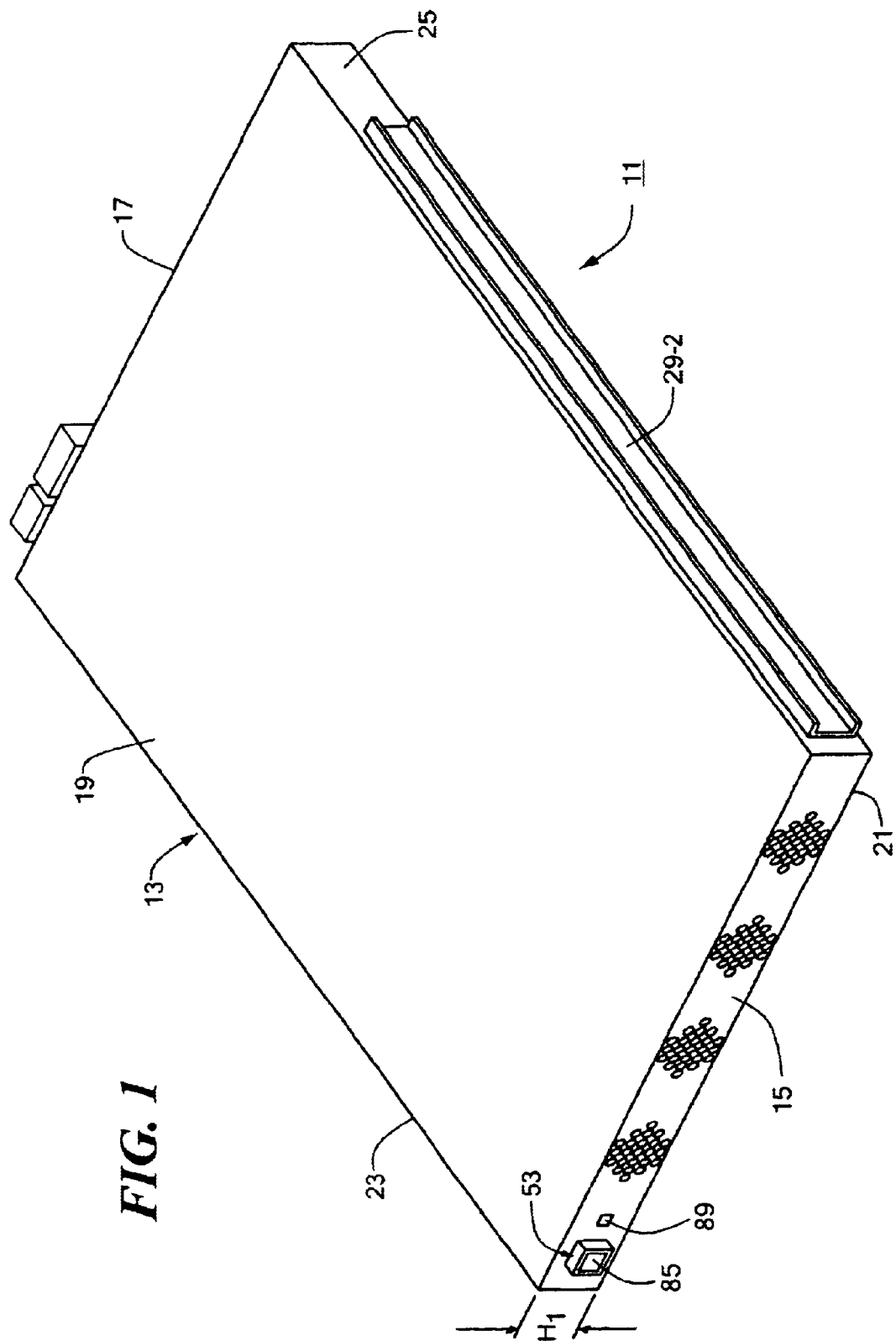
FIG. 1 is a top perspective view of a compute element constructed according to the teachings of the present invention.

Referring now to FIG. 1, there is shown a compute element constructed according to the teachings of the present invention, the compute element being identified generally by reference numeral 11. As will be described further in detail below, compute element 11 is adapted to function at a plurality of different power states and to function at a plurality of different operational states.

Compute element 11 is preferably a computer network server. However, it is to be understood that compute element 11 is not limited to computer servers. Rather, compute element 11 represents any well-known class of computer, such as desktop, mobile and home computer machines, without departing from the spirit of the present invention.

Compute element 11 comprises a generally rectangular chassis, or housing, 13. Chassis 13 is shown as having a height $H_1$ which is approximately 2-U. However, it is to be understood that chassis 13 is not limited to having a 2-U height. Rather, chassis 13 could have an alternative height, such as 1-U or 4-U, without departing from the spirit of the present invention.

Chassis 13 of compute element 11 comprises a front panel 15, a rear panel 17, a top panel 19, a bottom panel 21, a left side panel 23 and a right side panel 25 which together define an interior cavity 27 therebetween. It should be noted that front panel 15 serves as the user interface control panel for compute element 11, as will be described further in detail below.

A pair of brackets 29 are fixedly mounted onto chassis 13 to enable compute element 11 to be slidably disposed within a generally rectangular rack console, or cabinet, 31. Specifically, a first bracket 29-1 is fixedly mounted onto left side panel 23 and a second bracket 29-2 is fixedly mounted onto right side panel 25.

Figure 2:
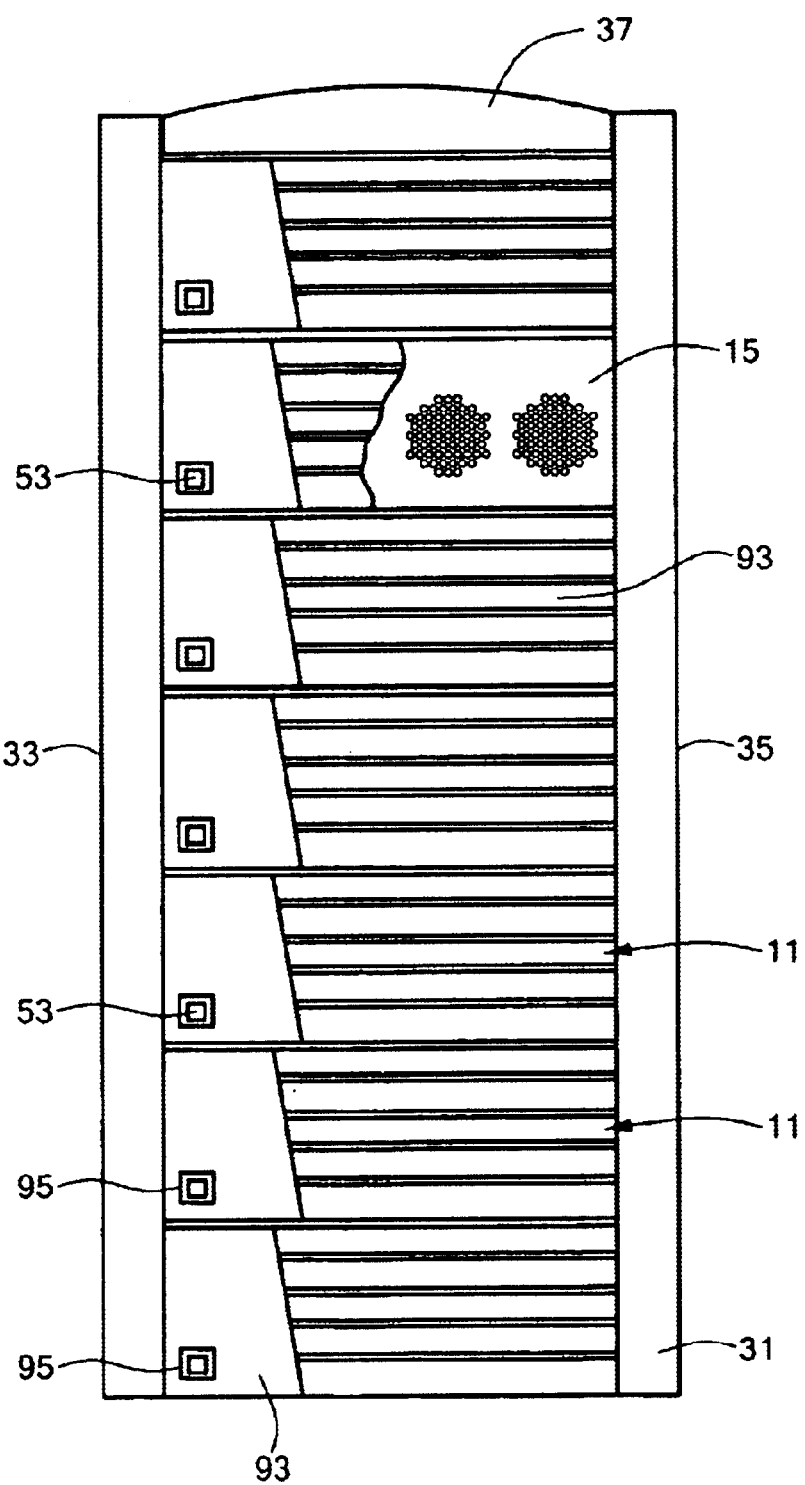
FIG. 2 is a front plan view of a plurality of the compute elements shown in FIG. 1, the plurality of compute elements being disposed inside a rack cabinet.

Referring now to FIG. 2, rack console 31 comprises a left side panel 33, a right side panel 35 and a top panel 37. As can be appreciated, rack console 31 is sized and shaped to enable a plurality of compute elements 11 to be slidably disposed therewithin in a stacked relationship. It is preferred that rack console 31 be constructed to meet NEMA industry size and dimension standards. However, it is to be understood that rack console 31 could be constructed in any size or dimension without departing from the spirit of the present invention.

Figure 3:
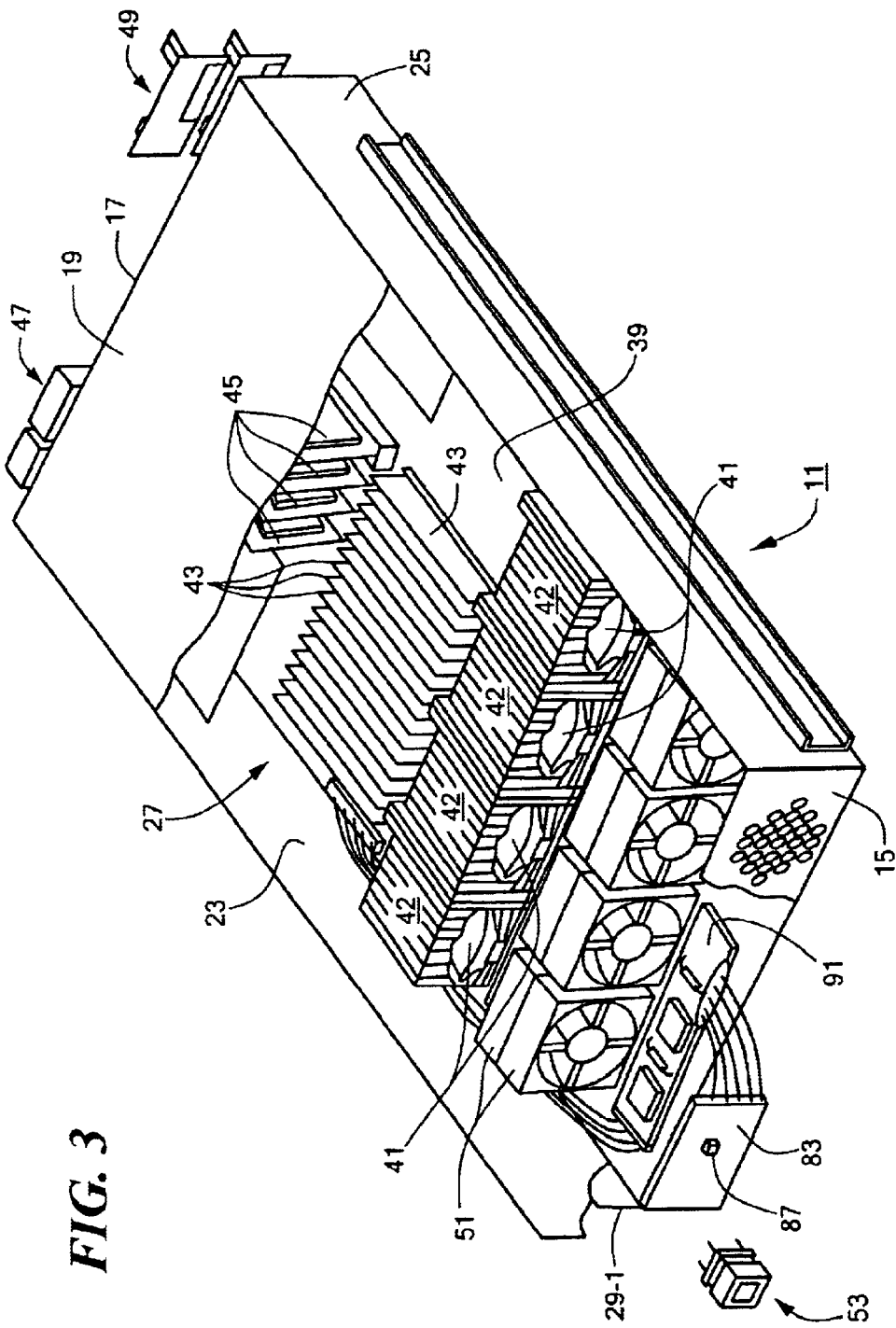
FIG. 3 is a partially exploded, top perspective view of the compute element shown in FIG. 1, the compute element being shown with the top panel and the front panel of the chassis broken away in part.

Referring now to FIG. 3, compute element 11 also comprises a main printed circuit board, or motherboard, 39 which is disposed within interior cavity 27 of chassis 13 on bottom panel 21. A plurality of microprocessors 41 are mounted on motherboard 39 and are responsible for the main computing functions and operational states for compute element 11 (i.e., running the operating system for compute element 11). An associated multi-finned heatsink 42 is mounted on each microprocessor 41, heatsinks 42 serving to facilitate cooling microprocessors 41. Preferably, plurality of microprocessors 41 are in the form of four processors, such as four PENTIUM processors manufactured by INTEL CORPORATION. However, it is to be understood that alternative numbers and types of microprocessors could be used in place of plurality of microprocessors 41 without departing from the spirit of the present invention.

A plurality of dual in-line memory modules (DIMM) 43 and a plurality of peripheral component interconnects (PCI) 45 are also mounted on motherboard 39. It should be noted that modules 43 and interconnects 45 do not serve as a principal feature of the present invention. Accordingly, modules 43 and interconnects 45 could be removed from compute element 11 without departing from the spirit of the present invention.

A pair of signal snap interfaces 47 are disposed in rear panel 17 of chassis 13. Each signal snap interface 47 preferably supplies a total of two local area network (LAN) interfaces and two Fiber Channel interfaces out rear panel 17 of chassis 13. Each signal snap interface 47 may be connected directly to motherboard 39 or, in the alternative, be connected to a mezzanine card disposed above motherboard 39. It should be noted that signal snap interfaces 47 do not serve as a principal feature of the present invention. Accordingly, signal snap interfaces 47 could be removed from compute element 11 without departing from the spirit of the present invention.

A pair of power snap interfaces, or direct current converter and interface assemblies (DCIAs), 49 are also disposed in rear panel 17 of chassis 13. Power snap interfaces 49 assist in providing the necessary power to run compute element 11. It should be noted that power snap interfaces 49 do not serve as a principal feature of the present invention. Accordingly, power snap interfaces 49 could be removed from compute element 11 without departing from the spirit of the present invention.

A plurality of fan assemblies 51 are disposed in cavity 27 of chassis 13 in close proximity to front panel 15. In use, fan assemblies 51 serve to draw cool air into cavity 27 through ventilation openings formed in front panel 15 in order to cool various electrical components contained within cavity 27 of compute element 11. Preferably, eight fan assemblies 51 are utilized and are disposed in a two by four configuration. However, it should be noted that fan assemblies 51 do not serve as a principal feature of the present invention. Accordingly, a different type, number and/or configuration of fan assemblies 51 could be utilized in compute element 11 without departing from the spirit of the present invention.

A power button 53 is disposed in front panel 15, as shown in FIG. 1. As will be described further in detail below, power button 53 serves as both the power button and the reset button for compute element 11. In addition, power button 53 serves as an indicator for displaying the operational and/or power state of compute element 11, power button 53 functioning as an indicator which is user intuitive and which complies with industry promulgated, advanced configuration and power interface (ACPI) specification guidelines. As such, it should be noted that the implementation of power button 53 into compute element 11 serves as a principal feature of the present invention.

Power button 53 is a momentary push-button switch which comprises a variable color and frequency backlight 55 and a variable text and/or graphics display 57, backlight 55 and display 57 operating independently of one another.

As will be described further in detail below, power button 53 is freely programmable so as to enable backlight 55 to provide backlighting of varying colors (i.e., green, red and/or amber colored light) at varying frequencies (i.e., solid light, 1 Hz blinking light, etc.), as will be described further in detail below. It should be noted that backlighting is typically used to illuminate a liquid crystal display (LCD) when the ambient lighting is insufficient to enable the display to be read. However, in this application, the primary function of backlight 55 is to provide means for indicating the particular power and operational state of compute element 11 in a manner required by industry promulgated, advanced configuration and power interface (ACPI) specification guidelines, which is a principal object of the present invention.

In addition, as will be described further in detail below, power button 53 is freely programmable so as to enable display 57 to provide various text and graphics indicators. It should be noted that the primary function of display 57 is to provide the user with a highly intuitive means for identifying the operational and/or power state of compute element 11 and for instructing the user what steps must be taken in particular circumstances (i.e., fault conditions).

Power button 53 may be, but is not limited to, a LC 24.4 TREND push-button switch manufactured by PREH ELECTRONICS, INC. of Lake Zurich, Ill. However, it should be noted that the present invention pertains to the implementation of a power button which can be programmed to independently produce variable color/frequency backlighting and variable text and/or graphics displays into a compute element. As such, it is to be understood that alternative power buttons which can be similarly programmed to independently produce variable color/frequency backlighting and variable text and/or graphics displays could be utilized in place of power button 53 without departing from the spirit of the present invention.

Referring now to FIGS. 4–8, power button 53 is a momentary contact push button switch. Power button 53 comprises a bottom casing 59 constructed of a rigid and durable material, such as plastic. A pair of pins 61 are fixedly mounted onto bottom casing 59, pins 61 being disposed to project out through bottom casing 59, as shown in FIG. 5. In addition, four spring biased pins 63 are similarly coupled to bottom casing 59, pins 63 being disposed to project out through bottom casing 59. Spring biased pins 63 are also disposed to project through openings formed in retaining plate 65. As such, spring biased pins 63 enable retaining plate 65 to be slidably displaced towards bottom casing 59, with spring pins 63 resiliently urging retaining plate 65 away from bottom casing 59.

A printed circuit board 67 is mounted on retaining plate 65, pins 63 being fixedly connected to printed circuit board 67. An application specific integrated circuit (ASIC) 69 is preferably mounted on printed circuit board 67 to control the operation of backlight 55 and display 57. However, it is to be understood that application specific integrated circuit (ASIC) 69 is not essential and, accordingly, could be removed from power button 53 without departing from the spirit of the present invention. Specifically, instead of utilizing ASIC 69, the operation of backlight 55 and display 57 could alternatively be completely controlled by the element controller (which will be described in detail below) without departing from the spirit of the present invention.

Figure 4:
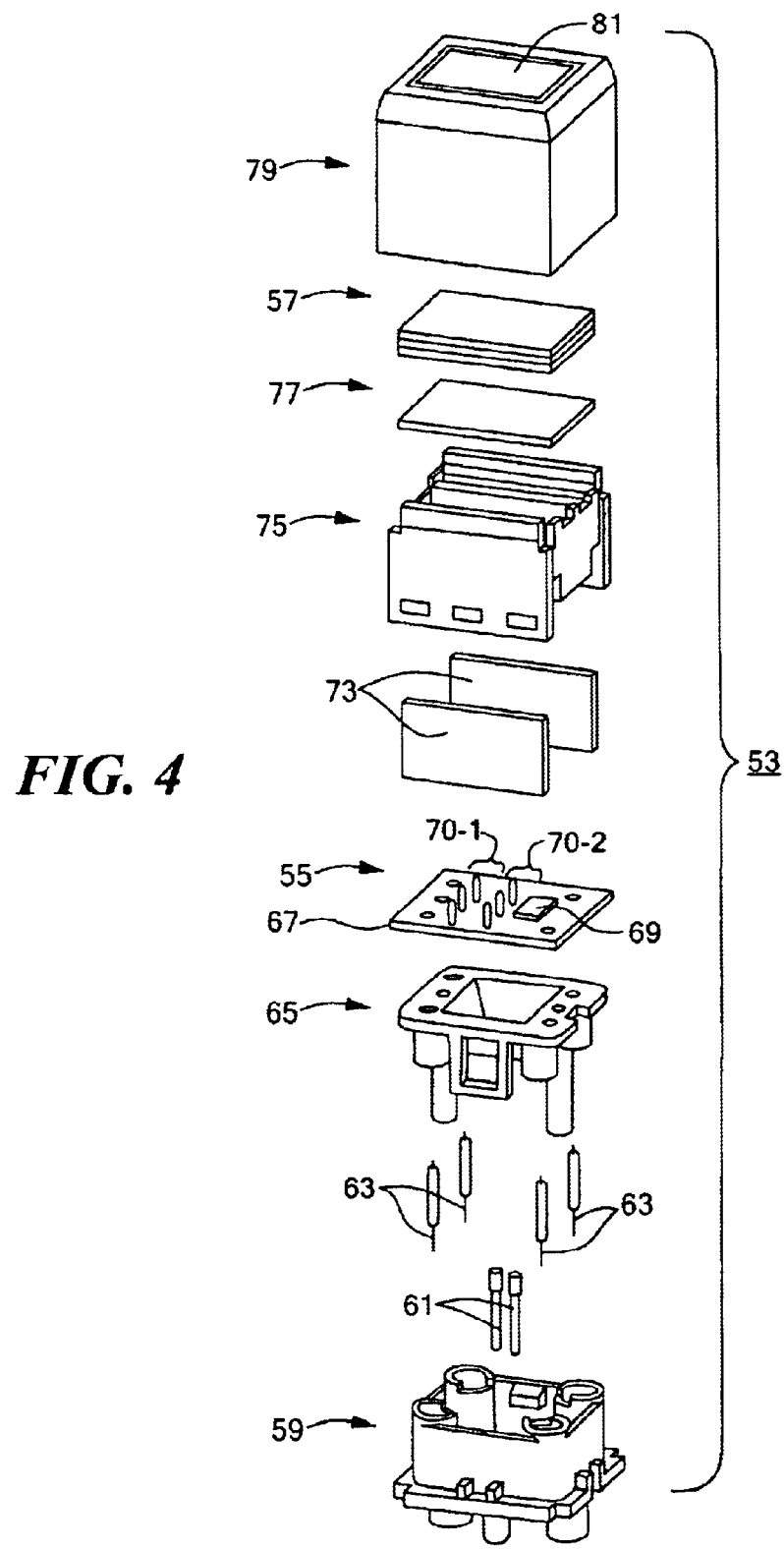
FIG. 4 is an exploded perspective view of the power button shown in FIG. 1.

Backlight 55 is mounted on printed circuit board 67. Backlight 55 is represented in FIG. 4 by a plurality of red light emitting diodes (LEDs) 71-1 and a plurality of green light emitting diodes (LEDs) 71-2 which together can provide variable colored, even and consistent backlighting. It should be noted that together LEDs 71 are capable of producing not only red and green light but also a spectrum of colors therebetween, such as orange and yellow. As such, because LEDs 71 are capable of producing green, red, orange and yellow light, power button 53 can operate in compliance with the international indicator color and implied meaning standards (i.e., IEC standard 73), which is highly desirable.

However, it is to be understood that backlight 55 is not limited to first set of LEDs 71-1 and second set of LEDs 71-2. Rather, it should be noted that backlight 55 represents any type of well-known backlight assembly which can produce variable color and frequency backlighting without departing from the spirit of the present invention.

A pair of conduction rubbers 73 are disposed to electrically connect selected circuits on printed circuit board 67 to selected circuits on display 57. Specifically, rubbers 73 are drawn into contact with printed circuit board 67 and the underside of display 57. Preferably, rubbers 73 are slightly compressed when disposed between PCB 67 and display 57 during manufacturing in order to ensure that conduction rubbers 73 remain in constant electrical contact with display 57 and with printed circuit board 67 which drives display 57.

A diffuser 77 is mounted onto backlight frame 75. Together, diffuser and backlight frame 75 serve to contain and evenly disperse the light produced by backlight 55 up through display 57.

Display 57 is mounted on diffuser 77 and is electrically connected to printed circuit board 67. Display 57 is preferably a liquid crystal display (LCD) display comprising a 36 by 24 individual pixel matrix, wherein every pixel can be turned off or on individually in order to provide text and animated graphics capabilities. As such, approximately 2–4 rows of up to 9 characters can be displayed on display 57. However, it is to be understood that the display 57 could include alternative individual pixel matrixes (i.e., 32 by 16) and could be made out of different materials without departing from the spirit of the present invention.

Preferably, display 57 is transflective. Specifically, it is preferred that light (i.e., backlight) be capable of passing through display 57 and light (i.e., ambient light) be capable of reflecting off display 57. As such, display 57 is capable of being read regardless of whether backlight 55 is on or off. If backlight 55 is off, normal operating conditions preferably supply enough ambient light so as to allow display 57 to be read. As can be appreciated, because display 57 can be read when backlight 55 is off, a graphics or text display can be provided on display 57 even when backlight 55 is off (i.e., when compute element 11 is in its full power off condition, which will be described further in detail below).

A top casing 79 having a clear window 81 is disposed over display 57, diffuser 77, backlight housing 75, conduction rubbers 73, printed circuit board 67, a portion of retaining plate 65 and a portion of bottom casing 59. As such, top casing 79 is capable of being displaced relative to the bottom casing to provide a tactile, momentary switching state. Specifically, the downward displacement of top casing 79 and backlight frame 75, in turn, urges printed circuit board 67 downward in such a manner that pins 61 project through retaining plate 65 and are drawn into selective contact with printed circuit board 67. As such, drawing printed circuit board 67 into selective contact with pins 61 causes pins 61 to short together, thereby effecting a change in the switching state of power button 53.

It should be noted that clear window 81 functions not only as a window through which the user can read display 57 and observe the light produced by backlight 55 but also as an actuation surface for effecting a change in the switching state of power button 53.

Preferably, power button 53 is mounted onto a front panel circuit board 83 which is disposed in interior cavity 27 of chassis 13 against front panel 15. Specifically, power button 53 projects through a rectangular opening 85 formed in front panel 15 and pins 61 and 63 of power button 53 are electrically and mechanically coupled to board 83. It should be noted that, with power button 53 mounted on board 83, first connection pin 63-1 is connected to a clock (for the internal control of ASIC 69), second connection pin 63-2 is connected to a data line, third connection pin 63-3 is connected to a power source (i.e., 5 volt Vcc) and fourth connection pin 63-4 is connected to a ground line.

It should be noted that a non-maskable interrupt (NMI) switch 87 is also mounted onto front panel circuit board 83. NMI switch 87 preferably includes tactile response and is disposed entirely within interior cavity 27 of chassis 13, NMI switch 87 being accessible for activation, by a service technician, through a small NMI switch opening 89 which is formed in front panel 15 of chassis 13. As can be appreciated, NMI switch 87 provides compute element 11 with the ability to create a dump file for operating system debugging after a system hang or failure.

Front panel circuit board 83 is connected to an element controller 91 which is disposed within interior cavity 27 between motherboard 39 and front panel 15, element controller also being connected to motherboard 39. Element controller 91 is easily user programmable and primarily functions to control the power state of compute element 11, to control backlight 55 and display 57 of power button 53, to monitor the voltage or power within compute element 11, to monitor the operation and temperature of microprocessors 41, to control the operation of fans 51 and to monitor the temperature at the inlet of fans 51. It should be noted that element controller 91 can be programmed to enable compute element 11 to support industry promulgated operating system power management features and user interface control panel specification guidelines, as will be described further in detail below. Preferably, compute element 11 is capable of operating at a working power state, a sleeping power state, a hibernate power state, a soft off power state and a full off power state.

It should be noted that the novelty of the present invention pertains to interrelation of chassis 13, power button 53, motherboard 39 and element controller 91. Accordingly, all other components which are integrated into compute element 11 could be removed and/or replaced with alternative components without departing from the spirit of the present invention.

It should also be noted that a removable front bezel 93 is preferably pivotally mounted onto compute element 11 over front panel 15 to provide a protective and aesthetically pleasing cover for compute element 11, as shown in FIG. 2. Front bezel 93 includes a rectangular opening 95 formed therein which is sized and shaped to enable power button 53 to extend partially therethrough.

In use, power button 53 serves as the primary user interface, button 53 acting as both a momentary switch for manually changing the power state of compute element 11 and as an indicator for displaying the operational and power status of compute element 11. FIG. 9 represents a chart which provides examples of various indicators power button 53 could provide upon experiencing selected power/operational states for compute element 11. However, it should be noted that the chart provided in FIG. 9 only provides examples. As such, compute element 11 is not limited to the particular indicators listed in FIG. 9, but rather could be programmed to include any type of indicator means upon experiencing any potential power and/or operational condition without departing from the spirit of the present invention.

Referring to the first condition listed in FIG. 9, when compute element 11 is operating at its working power state, backlight 55 preferably provides a solid green backlight, thereby rendering compute element 11 in accordance with industry promulgated ACPI specification guidelines. In addition, display 57 preferably provides a simple text line which intuitively notifies the user of the current power state, such as "power on," and/or a simple icon display which intuitively notifies the user of the current power state, such as the international full power on icon "1". As can be appreciated, because the international full power on icon "1" is preferably located directly on display 57 of power button 53, compute element 11 meets international standards (i.e., IEC standard 73) that require, when used, the full power on icon "1" be implemented directly on or immediately surrounding the main power line switch. It should be noted that power button 53 is not limited to the aforementioned backlight and display indicators for the first condition listed in FIG. 9 but rather could include alternative indicators without departing from the spirit of the present invention.

Referring to the second condition listed in FIG. 9, when compute element 11 is operating at its working power state and experiences compute activity, backlight 55 preferably provides a green backlight which blinks on and off at a relatively high frequency, such as 30 Hertz. In addition, display 57 preferably provides a simple text line which intuitively notifies the user of the current power/operational state, such as "power on/compute activity". In addition, display 57 preferably provides a simple icon display which intuitively notifies the user of the current power state, such as the international full power on icon "1". It should be noted that power button 53 is not limited to the aforementioned backlight and display indicators for the first condition listed in FIG. 9 but rather could include alternative indicators without departing from the spirit of the present invention.

Referring to the third condition listed in FIG. 9, when compute element 11 is operating at its sleeping power state, backlight 55 preferably provides a green backlight which flashes on and off at the relatively low frequency of 1 Hz, thereby rendering compute element 11 in accordance with industry promulgated ACPI specification guidelines. In addition, display 57 preferably provides a simple text line which intuitively notifies the user of the current power state, such as "sleep". It should be noted that power button 53 is not limited to the aforementioned backlight and display indicators for the third condition listed in FIG. 9 but rather could include alternative indicators without departing from the spirit of the present invention.

Referring to the fourth condition listed in FIG. 9, when compute element 11 is operating at its hibernate power state, backlight 55 preferably provides no backlighting, thereby rendering compute element 11 in accordance with industry promulgated ACPI specification guidelines. In addition, display 57 preferably provides a simple text line which intuitively notifies the user of the current power/operational state, such as "hibernate". It should be noted that power button 53 is not limited to the aforementioned backlight and display indicators for the fourth condition listed in FIG. 9 but rather could include alternative indicators without departing from the spirit of the present invention.

Referring to the fifth condition listed in FIG. 9, when compute element 11 is operating at its soft off power state, backlight 55 preferably provides no backlighting, thereby rendering compute element 11 in accordance with industry promulgated ACPI specification guidelines. In addition, display 57 preferably provides a simple text line which intuitively notifies the user of the current power state, such as "soft off" or "power off", and/or a simple icon display which intuitively notifies the user of the current power state, such as the international power off icon "0". As can be appreciated, because the international power off icon "0" is preferably located directly on display 57 of power button 53, compute element 11 meets international standards (i.e., IEC standard 73) that require, when used, the power off icon "0" be implemented directly on or immediately surrounding the main line power switch. It should be noted that power button 53 is not limited to the aforementioned backlight and display indicators for the fifth condition listed in FIG. 9 but rather could include alternative indicators without departing from the spirit of the present invention.

Referring to the sixth condition listed in FIG. 9, when compute element 11 is operating at its full off power state, backlight 55 preferably provides no backlighting, thereby rendering compute element 11 in accordance with industry promulgated ACPI specification guidelines. In addition, display 57 preferably provides either no text display or a simple text line which intuitively notifies the user of the current power state, such as "full off" or "power off", and/or a simple icon display which intuitively notifies the user of the current power state, such as the international power off icon "0". As can be appreciated, when compute element 11 operates at its full off power state, power button 53 still draws the necessary power required to function from standby voltage. It should be noted that power button 53 is not limited to the aforementioned backlight and display indicators for the sixth condition listed in FIG. 9 but rather could include alternative indicators without departing from the spirit of the present invention, thereby intuitively notifying the user of the current power/operational state.

Referring to the seventh condition listed in FIG. 9, when compute element 11 experiences a fault condition, backlight 55 preferably provides a solid orange backlight, thereby rendering compute element 11 in accordance with industry promulgated ACPI specification guidelines. In addition, display 57 preferably provides a simple text line which intuitively notifies the user of the specific hard and/or informative failures that were detected, such as "FAN failure", "[CPU]/[System] temp failure", "System PWR failure", or "[CPU]/[System] temp high." It should be noted that informative failures detected by compute element 11 could alternatively be accompanied by a solid yellow backlight, rather than a solid orange backlight, without departing from the spirit of the present invention. It should also be noted that power button 53 is not limited to the aforementioned backlight and display indicators for the seventh condition listed in FIG. 9 but rather could include alternative indicators without departing from the spirit of the present invention.

Referring to the eighth condition listed in FIG. 9, when compute element 11 experiences hardware and/or software failure which results in a system hang, backlight 55 preferably provides a solid orange backlight, thereby rendering compute element 11 in accordance with industry promulgated ACPI specification guidelines. In addition, display 57 preferably provides a simple text line which intuitively notifies the user of the system failure, such as "system hang", along with user instructions pertaining to the four second override mechanism, such as "depress power button for four seconds until system shuts down". It should be noted that power button 53 is not limited to the aforementioned backlight and display indicators for the eighth condition in FIG. 9 but rather could include alternative indicators without departing from the spirit of the present invention.

Referring to the ninth condition listed in FIG. 9, when compute element 11 experiences a dangerous/hazardous condition, backlight 55 preferably provides a solid red backlight, thereby rendering compute element 11 in accordance with industry promulgated ACPI specification guidelines. In addition, display 57 preferably provides a simple text line which intuitively notifies the user of the hazardous condition, such as "Severe Hazard" or "Hazardous Condition Exists." It should be noted that power button 53 is not limited to the aforementioned backlight and display indicators for the ninth condition listed in FIG. 9 but rather could include alternative indicators without departing from the spirit of the present invention.

Referring to the tenth condition listed in FIG. 9, when compute element 11 experiences a likely fault condition or another operational state which results in a manual activation of NMI switch 87, backlight 55 is preferably provides colored light based on the present condition of compute element 11. In addition, display 57 preferably provides a simple text line which intuitively confirms the start of the NMI dump process of files into the hard drive and subsequently acknowledges completion, such as "NMI dump in process, please wait" followed by "NMI dump complete." As can be appreciated, because prior art computers provide no means for indicating to the user that an NMI switch has been actuated, compute element 11 is more desirable than prior art computers. It should be noted that power button 53 is not limited to the aforementioned backlight and display indicators for the tenth condition listed in FIG. 9 but rather could include alternative indicators without departing from the spirit of the present invention.

As can be appreciated, power button 53 supplies compute element 11 with an intuitive enhancement for the standard user interface for computer machines, while remaining in compliance with the strict ACPI specification/guidelines. In addition, it is to be understood that power button 53 is not limited to the power/operational states listed in FIG. 9 but rather could be programmed to provide intuitive indicators for additional power/operational states without departing from the spirit of the present invention.

As noted above, the novelty of the present invention pertains to the integration of power button 53 into a compute element, such as a computer server. Resultingly, it is to be understood that power button 53 could be implemented into alternative types of similar compute elements without departing from the spirit of the present invention.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A compute element which is adapted to function at a plurality of different power states and which is adapted to function at a plurality of different operational states, said compute element comprising:
   (a) a chassis comprising a front panel, a rear panel, a top panel, a bottom panel and a pair of side panels which together define an interior cavity therebetween,
   (b) a motherboard disposed within the interior cavity of said chassis for regulating the operational state of said compute element,
   (c) an element controller disposed within the interior cavity of said chassis for regulating the power state of said compute element, said element controller being connected to said motherboard, and
   (d) a power button disposed in the front panel of said chassis for indicating at least one of the power and operational states of said compute element, said power button being connected to said element controller, wherein the power state of said compute element can be changed through actuation of said power button, said power button comprising,
   (i) a display adapted to provide graphics and/or text displays, and
   (ii) a backlight adapted to provide backlighting in two or more colors and at two or more frequencies,
   (iii) wherein said display and said backlight provide indication means as to the power state and/or fault condition of said compute element.

2. The computer element of claim 1 wherein said power button is disposed in the front panel of said chassis for indicating both the power and operational states of said compute element.

3. The compute element of claim 1 wherein said power button is a momentary contact push button switch, the display and backlight of said power button being incorporated into the push button switch.

4. The compute element of claim 1 wherein the display of said power button is in the form of a liquid crystal display.

5. The compute element of claim 1 wherein the display and the backlight of said power button are controlled by said element controller, said element controller being adapted to be programmed.

6. A compute element which is adapted to function at a plurality of different power states and which is adapted to function at a plurality of different operational states, said compute element comprising:
   (a) a chassis shaped to include an interior cavity,
   (b) a motherboard disposed within the interior cavity of said chassis, and
   (c) a power button disposed in said chassis for indicating at least one of the power and operational states of said compute element, said power button being connected to said motherboard, wherein the power state of said compute element can be changed through actuation of said power button, said power button comprising a display which is adapted to provide graphics and/or text displays and a backlight adapted to provide backlighting in two or more colors and at two or more frequencies,
   (d) wherein said display and said backlight provide indication means as to the power, state and/or fault condition of said compute element.

7. The compute element of claim 6 wherein the display of said power button is a liquid crystal display.

8. The compute element of claim 6 further comprising an element controller disposed in the interior cavity of said chassis, said element controller being connected to said motherboard and said power button, said element controller controlling the display of said power button.

* * * * *